March 24, 1970     D. R. PHILLIPS     3,502,299

RESILIENT LINER FOR BUTTERFLY VALVES

Filed May 3, 1967     2 Sheets-Sheet 1

INVENTOR.
DONALD R. PHILLIPS

BY Head & Johnson

ATTORNEYS

INVENTOR.
DONALD R. PHILLIPS

United States Patent Office 3,502,299
Patented Mar. 24, 1970

3,502,299
RESILIENT LINER FOR BUTTERFLY VALVES
Donald R. Phillips, Tulsa, Okla., assignor to The Hale Company, Tulsa, Okla., a corporation of Ohio
Filed May 3, 1967, Ser. No. 635,719
Int. Cl. F16k 1/226
U.S. Cl. 251—306                 4 Claims

ABSTRACT OF THE DISCLOSURE

This invention relates to improvements in resilient liners for butterfly valves. The improved liner is characterized by provision in the internal cylindrical surface of increased diameter valley portions between an intermediate reduced internal diameter disc engaging portion and the ends of the member. The configuration provides means whereby the seat may be dimensioned to have increased length end portions to afford cold flow as the seat is positioned between flanges in a valve body bore but in a manner wherein the cold flow does not effectively alter the internal diameter of the disc engaging portion.

SUMMARY

Buterfly valves are widely used in industries. One type of buterfly valve which has been widely accepted in industry includes a valve body having an axial bore therethrough, in which is positioned a removable resilient liner. Rotatably supported within the body and within the liner is a disc member having a cylindrical periphery. The disc is rotated to close the valve so that the plane thereof is perpendicular to the axis of the bore, in which position the periphery of the disc engages the resilient liner throughout the full circumference thereof. One problem with such removable liners is that when valves are used in high pressure applications, fluid or gases tend to be forced between the liner and the bore of the body, causing leakage of the valve. To overcome this leakage, resilient liners have been designed having configurations such that when the liners are placed in the valve body and pressed at each end thereof by abutting flanges, cold flow of the resilient liner member causes increased contact with the valve body axial bore to effectively prevent leakage of fluid between the liner and the valve body. United States Patent No. 3,314,641 is a good example of the design of butterfly valve seats to effectively prevent leakage between the seat and the valve body.

While the above referred to United States patent represents a substantial advancement of the art in butterfly valves, one difficulty with the valve seat of the design embodiment in that patent, which is typical of the problems encountered with other known resilient liners, is that when the liner is placed in a valve body and the abutting flanges are secured in position, cold flow of the resilient material making up the liner changes the internal diameter of the liner disc engaging portion. This undesirable characteristic makes it difficult to accurately and precisely design an effective removable resilient seat of the type above referred to since in its relaxed position it has one internal diameter and in the applied position, another.

This invention provides an improved removable butterfly valve liner having a configuration such that cold flow of the resilient material making up the liner is effectiely utilized to seal the liner against the valve body but wherein the cold flow is prevented from materially effecting the internal diameter of the disc engaging portion.

DESCRIPTION OF VIEWS

DETAILED DESCRIPTION

Figure 1:
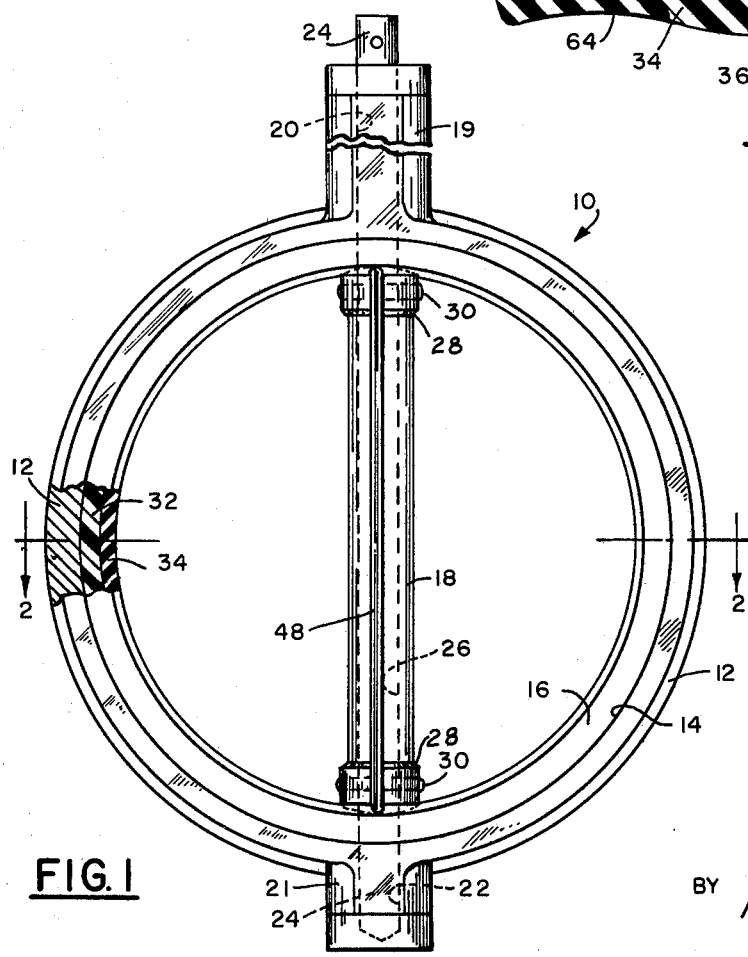
FIGURE 1 is an end view of a butterfly valve showing the disc member positioned in a plane parallel the axis of the body permitting free fluid flow to either side of the disc body.

Referring now to the drawings and first to FIGURE 1 the valve of this invention is indicated generally by the numeral 10. The valve includes a metallic body member 12 which has an axial bore 14 therethrough. Slidably positioned within the axial bore 14 is a tubular liner member 16. This invention is concerned with improvements in the tubular liner member 16. Rotatably supported within the body 12 and liner 16 is a disc member 18 shown in full open position.

Body 12 is provided at the upper end with a stem guide 19 having an opening 20 therein. The lower end of body 12 is provided with a lower stem receiving boss 21 having an opening 22. A stem 24 extends through openings 20 and 22 and partially exteriorly of the valve at the upper end thereof. Stem 24 is received by an opening 26 in disc member 18. By means of a handle or other device, (not shown), affixed to the exteriorly extending portion of stem 24, the disc member 18 may be rotated within the valve.

Disc member 18 is provided with an upper and lower enlarged flange portion 28. Pins 30 extend through the flange portions 28 and through stem 24 as a means of transmitting the rotation of the stem to the disc member. Although both upper and lower pins 30 are shown, only one of such pins is necessary to obtain locking relationship between the disc member and the stem.

The resilient seat 16 is shown partially in cross-section in FIGURE 1 which discloses the inclusion within the resilient seat of a rigid reinforcing member 32. Resilient seat 16 is composed of two basic elements, that is the enclosed reinforcing member 32 and the encompassing resilient tubular liner member 34.

mmm shrdlu etaoin shrdlu etaoin shrdlu etaoin sh mmm

Figure 2:
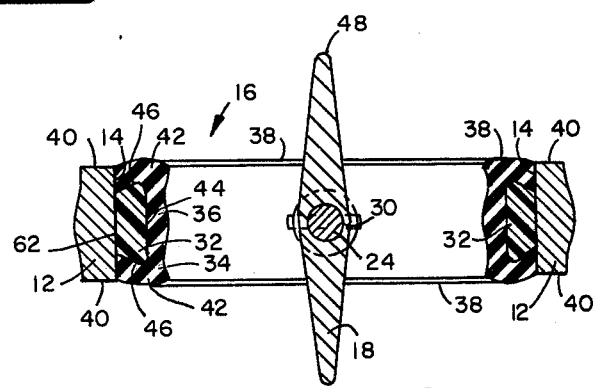
FIGURE 2 is a cross-sectional view taken along the line 2—2 of FIGURE 1.

Referring to FIGURE 2, a cross-sectional view taken along the line 2—2 of FIGURE 1, more details of construction of the valve depicted is shown. The valve depicted is the well known type adaptable to be utilized between flanges or other supporting members by means whereby the valve is affixed to piping or other fluid conducting devices. Valve body member 12, as previously mentioned, is provided with an axial bore 14. The disc member 18 (shown in full open position) is supported to the stem 24 by means of pins 30. As previously indicated, the tubular liner 16 is composed of resilient liner member 34 and reinforcing member 32. The tubular resilient liner 34 is provided with an integrally reduced internal diameter seating portion 36 intermediate the ends 38.

The length of resilient member 34 (as measured parallel the tubular axis) is greater than the length of the tubular bore 14 in body member 12, that is, the ends 38 of the resilient member 14 extend beyond the parallel ends 40 of body 12. Each end 38 is formed by an integral arcuate increased length portion 42 intermediate the interior and exterior diameters of the resilient member 34. The function of the integral arcuate increased length portions 42 will be described subsequently.

The reinforcing member 32, which may be composed of any rigid material, such as hard rubber, plastic, metal or so forth, may generally be described as tubular in configuration. In the preferred embodiment the reinforcing member 32 has an interior periphery having an integral reduced internal diameter portion 44 which substantially conforms to and is spaced from the integral reduced internal diameter portion 36 of the resilient member 34. Reinforcing member 32 is defined in cross section by tapered ends 46 converging toward a point exteriorly of the outer periphery.

Figure 3:
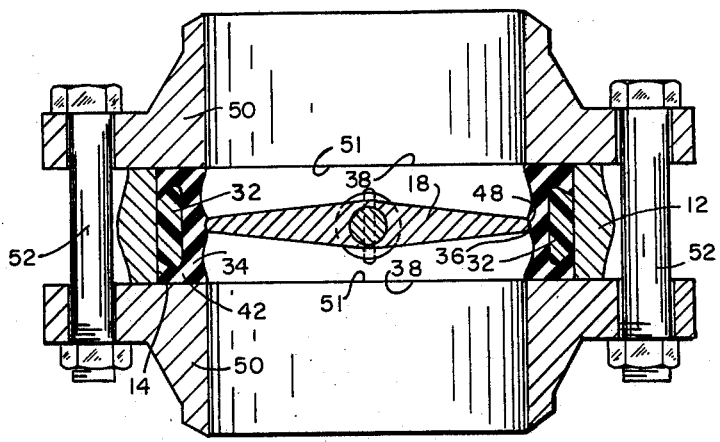
FIGURE 3 is a cross-sectional view as shown in FIGURE 2 but showing the disc rotated to the closed position and showing the valve body engaged by flanges as the valve is typically utilized in industrial application.

FIGURE 3 shows the valve of this invention with the disc member 18 in closed position wherein the sealing periphery 48 is in sealable engagement with the reduced internal diameter seating portion 36 of the resilient member 34. In addition, FIGURE 3 discloses the valve between two flanges 50, the flange face of each flange engaging an end 38 of the resilient member 34, held in position by bolts 52. The arcuate increased length end portions 42 of resilient member 34 have been displaced so that the total length of the tubular resilient member 34 in such deformed condition is the same as that of the axial bore 14 of body member 12.

Figure 4:
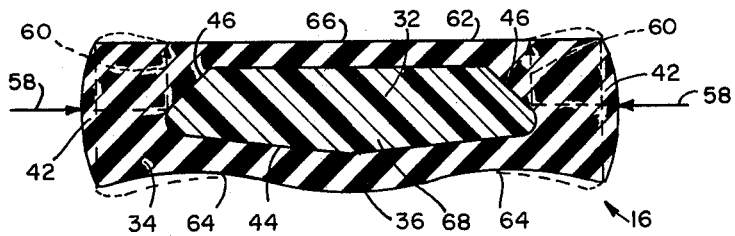
FIGURE 4 is a cross-sectional view of one embodiment of the liner for butterfly valves of this invention showing the normal cross-sectional configuration and in the dotted outline configuration which the resilient liner tends to take when flanges are abutted against it.

Referring now to FIGURE 4, the arrangement of liner 16 of the invention is shown diagrammatically to illustrate how means is provided to prevent or at least diminish leakage of fluid between the resilient liner and the body of the valve and, in addition, how means is provided such that the deformation of the resilient member by the pressure of flanges is isolated so that the dimensions of the reduced internal diameter disc engaging portion remains unaffected. This invention utilizes three important characteristics of elastomers, that is elastomers: (1) are substantially non-compressible; (2) have memory; and (3) flow under pressure. In solid line in FIGURE 4 is shown the normal configuration of a cross-sectional portion of liner 16, and in dotted line is shown the configuration which the liner tends to take when force is applied against the ends thereof, as occurs when flanges 50, such as shown in FIGURE 3, are applied to the ends of the valves to adapt it for use in a typical installation. Arrows 58 represent the force applied by flanges pressing against the resilient seat 16. This force tends to deform the arcuate increased length portions 42 of the resilient member inwardly. This tends to cause transverse flow within the resilient material as indicated by the dotted arrows 60. The resilient material contained in the area designated as 42 in the drawings is moved inwardly and by the effect by the tapered ends 46 of the reinforcing member 32, the force is transmitted in a direction towards the outer periphery 62 of the resilient member 34. The outer periphery 62 is, of course, in close proximity with the valve body axial bore 14 (see FIGURE 2) so that in reality the distortion of the outer periphery 62 is for the most part prevented from taking place by the valve body. This distortion however, does produce considerable sealing pressure of the resilient body member 34 at each outer-peripheral end and around the total periphery thereof against the body of the valve. This sealing pressure prevents fluid seepage from passing between the exterior periphery 62 of the liner 16 and the valve body.

The essential novelty of the invention is the provision of means wherein a valve seat liner is provided for a butterfly valve having a configuration such that when flanges are applied to tne liner cold flow of the resilient material causes a sealing pressure against the body in which the liner is positioned to prevent leakage between the liner and the body as described immediately above, and at the same time such that the cold flow of resilient material is prohibited from altering the dimensions of the reduced internal diameter disc engaging portion of the resilient member.

Figure 5:
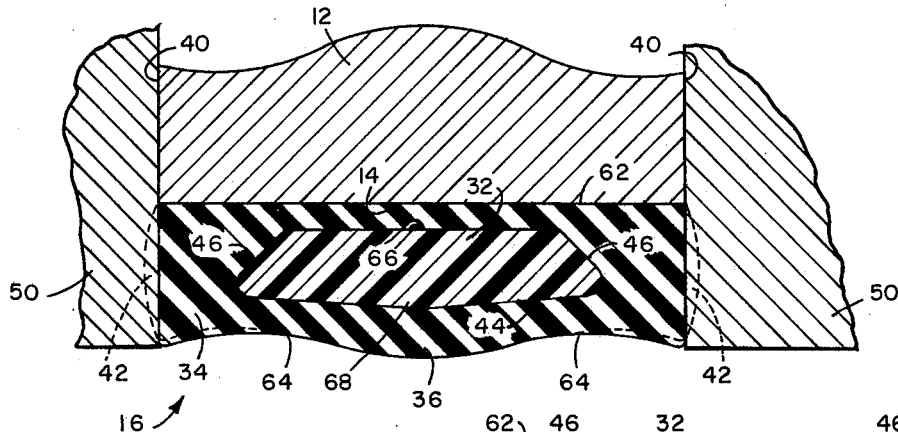
FIGURE 5 is a cross-sectional view of a liner embodying the principles of this invention positioned within a valve body and abutted by flanges showing the normal configuration of the liner in dotted outline.

A vital part of the novelty of this invention is the provision in the cross-sectional configuration of the liner of an increased internal diameter valley portion 64 intermediate the reduced internal diameter disc engaging portion 36 and each end 42. The internal diameter of each valley portion 64 is greater than the internal diameter of the resilient member 34 at the disc engaging portion 36 and the ends portion 42. The advantages and benefits derived from the provision of this configuration affording valley portion 64 will be explained in detail subsequently. Reference is next made to FIGURE 5. FIGURE 4 shows a cross-sectional view of the valve liner of this invention in its normal relaxed configuration and in dotted outline the configuration which the resilient member tends to take upon application of flanges. FIGURE 5 is a cross-sectional view of the liner of this invention positioned within a valve body 12 with flanges 50 securely affixed to the body. In this view, the normal relaxed configuration of the resilient member is shown in dotted outline and the configuration which the member takes upon the application of flanges is shown in solid line.

As previously described with reference to FIGURE 4, the optimum configuration of resilient member 32 includes the provision of exteriorly convergingly tapered ends 46 so that the maximum portion of the cold flow of resilient member 34 tends to be deflected outwardly towards the external peripheral surface 62 and against the bore 14 of the valve body 12. This flow tendency however is restricted by the configuration of the body bore, while the flow tendency is directed by the configuration of the reinforcing member 32 towards the bore 14 the amount of cold flow in this direction is limited. Since the elastomer resilient member is substantially non-compressible, this means that the cold flow caused by the displacement of the arcuate increased length portions 42 must in some other way effect the dimensions of the resilient member. In prior resilient valve seats having increased length end portions cold flow has resulted in a general reduction of the internal diameter of the resilient member. This has undesirable effects. In order to design an insert for a butterfly valve so that the maximum sealing effectiveness between the insert and the disc is maintained with minimum interference as the disc is opened and closed the dimensions of the portion of the resilient seat contacted by the valve disc must be stable. By the unique provision of this invention the resilient member is arranged in such a way that the cold flow of resilient material is prevented from effecting the disc engaging portion of the seat.

As shown in FIGURE 5, when flanges 50 are applied, the valley portions 64 in the face of the resilient member 34 isolate and absorb the cold flow of the resilient material leaving undisturbed, the dimensions of disc engaging portions 36.

Figure 7:
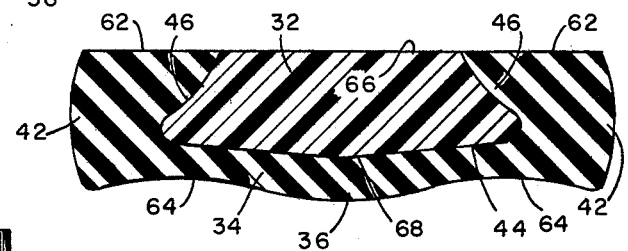
FIGURE 7 is a cross-sectional view of a liner of this invention showing a design wherein the ends of the reinforcing member are nonlinearly tapered.
Figure 6:
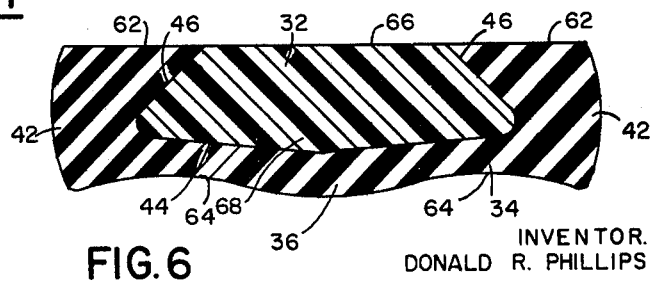
FIGURE 6 is a cross-sectional view of a liner showing an alternate embodiment wherein the reinforcing member has the full exterior diameter of the bore of the valve body in which the liner will be positioned.

FIGURES 6 and 7 illustrate other embodiments of the butterfly valve liner within the scope of the invention. In these embodiments, the resilient portion 34 encompasses the internal cylindrical surface and the ends of the reinforcing member 32. The external cylindrical surface 66 of the reinforcing member 32 engages the bore 14 in the body of the valve in which the liner is positioned. The function of the resilient member 34 is the same in the arrangements of FIGURES 6 and 7 as has been previously described with reference to FIGURES 4 and 5.

FIGURE 7 shows an arrangement wherein the exteriorly convergingly tapered ends 46 of the reinforcing member 32 are of a non-linear configuration. This ex-exemplifies that the tapered ends 46 of reinforcing member 32 may be a variety of configurations.

FIGURES 4 through 7 each show the arrangement wherein the reinforcing member 32 is defined in cross-section by an integral circumferential reduced internal diameter portion 68 intermediate the ends 46 and spaced from the intermediate reduced internal diameter disc engaging portion 36 of the resilient member 34. This preferred arrangement maintains the minimum thickness of the member 34 above the internal cylindrical surface 44 of the reinforcing member 32. Certain elastomers tend to swell in the presence of hydrocarbons and other chemicals and by maintaining the resilient portion 34 at a reduced thickness the effect of swelling, if any, is minimized.

This invention provides an improved butterfly valve resilient seat insert having the advantage that the dimensional stability of the disc engaging portion of the resilient seat is maintained while at the same time providing cold flow of the seat to effect sealing between the seat and the valve body. As described and illustrated herein, the internal diameter of the disc engaging portion of the resilient member is the same, in practicality, in the relaxed as well as the operative position of the liner. At the same time, it is appreciated that some measurable dimensional effect of the disc engaging portion may be realized by designs incorporating the principle of this invention, however, such would be within the scope of the invention since the object is to eliminate, or at least minimize dimensional changes in the disc engaging portion of the resilient seat.

What is claimed:
1. A butterfly valve for fitting between spaced apart flanges each having a flange face, said valve comprising:
   a body member having paralleled flange engaging ends and an axial bore therethrough perpendicular the ends;
   a tubular rigid reinforcing member defined by an inner circumferential surface, an outer circumferential surface, and ends, the outer circumferential surface engaging the inner circumferential surface of said body axial bore;
   a tubular resilient member encompassing said inner circumferential surface and said ends of said reinforcing member, said resilient and said reinforcing member being positioned in said body member axial bore, said resilient member providing an axial fluid passageway therethrough, said resilient member being normally of a length sligthly greater than the axial length of said body member including a circumferential integral arcuate flange engaging portion at each end, the inner circumferential surface of said tubular resilient member being defined by a disc engaging portion intermediate the ends thereof, said disc engaging portion being arcuately inward beyond an imaginary line connecting the inner ends of said resilient member, and valley portions intermediate and connecting said disc engaging portion and each of said inner ends, said valley portions being arcuately outward beyond said imaginary line whereby as the ends of said resilient member are engaged by flange faces, the ends of said resilient member cold flow into said valley portions to retain substantially unaffected the inner dimensions of said disc engaging portion;
   a disc member pivotally supported in said fluid passageway in said resilient liner, said disc in part defined by a peripheral line engaging seat surface, said disc seating surface sealably engaging said reduced internal diameter disc engaging portion of said resilient member when the disc is in closed position; and
   means of pivoting said disc between open and closed position.

2. A valve according to claim 1 wherein said tubular rigid reinforcing member is defined in part by an integral circumferential reduced internal diameter portion intermediate the ends thereof substantially conforming to and spaced from the intermediate reduced internal diameter disc engaging portion of said reinforcing member.

3. A valve according to claim 1 wherein said ends of said tubular reinforcing member are exteriorly convergingly tapered and wherein said resilient member integral arcuate increased length flange engaging portions are aligned with and spaced from said tapered ends of said reinforcing member whereby as the flange engaging portions of said resilient member are engaged by flange faces the same are deformed against the said tapered ends of the reinforcing member causing increased radial outward sealing contact pressure of the resilient liner against the interior circumferential surface of the axial bore of said body member.

4. A valve according to claim 1 wherein the diameter of said outer circumferential surface of said reinforcing member is less than the diameter of the axial bore through said body member and wherein said resilient member fully encompasses said reinforcing member, the resilient member having an exterior circumferential surface engaging the interior circumferential surface of said body axial bore.

References Cited
UNITED STATES PATENTS

| | | | |
|---|---|---|---|
| 3,143,132 | 8/1964 | Pangburn | 251—306 X |
| 3,311,128 | 3/1967 | Taylor | 251—306 X |
| 3,314,641 | 4/1967 | Overbaugh | 251—306 X |
| 3,376,015 | 4/1968 | Forsman et al. | 251—306 |
| 3,118,465 | 1/1964 | Scaramucci | 137—454.2 |

HENRY T. KLINKSIEK, Primary Examiner

U.S. Cl. X.R

251—173